(12) United States Patent
Yabuta

(10) Patent No.: US 8,427,713 B2
(45) Date of Patent: Apr. 23, 2013

(54) DOCUMENT READER WITH AN IMAGE SENSOR ROTATING IN ACCORDANCE WITH DISTANCE BETWEEN A DOCUMENT SURFACE AND A PLATEN SURFACE

(75) Inventor: Junko Yabuta, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1024 days.

(21) Appl. No.: 12/383,145

(22) Filed: Mar. 20, 2009

(65) Prior Publication Data

US 2009/0237748 A1    Sep. 24, 2009

(30) Foreign Application Priority Data

Mar. 21, 2008  (JP) ................... 2008-073981

(51) Int. Cl.
*H04N 1/04* (2006.01)
*H04N 1/46* (2006.01)
(52) U.S. Cl.
USPC ............ 358/474; 358/488; 358/505
(58) Field of Classification Search .......... None
See application file for complete search history.

(56) References Cited

U.S. PATENT DOCUMENTS

| | | | | |
|---|---|---|---|---|
| 4,980,720 A | * | 12/1990 | Siegel | 399/52 |
| 2009/0059599 A1 | * | 3/2009 | Kelsay et al. | 362/300 |

FOREIGN PATENT DOCUMENTS

| | | |
|---|---|---|
| JP | 63-009364 A | 1/1988 |
| JP | H04-229848 A | 8/1992 |
| JP | 05-088278 A | 4/1993 |
| JP | H06-113081 A | 4/1994 |
| JP | 07-193689 A | 7/1995 |
| JP | 2004-320538 A | 11/2004 |
| JP | 2006-254132 A | 9/2006 |

* cited by examiner

*Primary Examiner* — Fan Zhang
(74) *Attorney, Agent, or Firm* — Edwards Wildman Palmer LLP; David G. Conlin; David A. Tucker

(57) ABSTRACT

A document reader includes an image sensor. The image sensor is movable in a secondary scanning direction and rotatable about a rotational axis extending in a primary scanning direction, and obtains image information from a region facing a light-receiving surface. Rotation of the image sensor is controlled based on distance information about a distance between a document surface and a platen in such a manner as to make an image distance fall within a depth-of-field range of the image sensor.

5 Claims, 7 Drawing Sheets

FIG.3
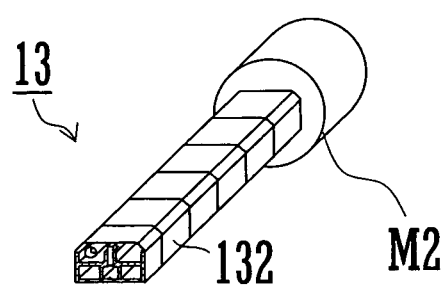
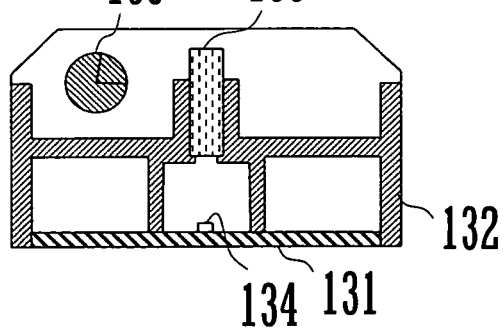

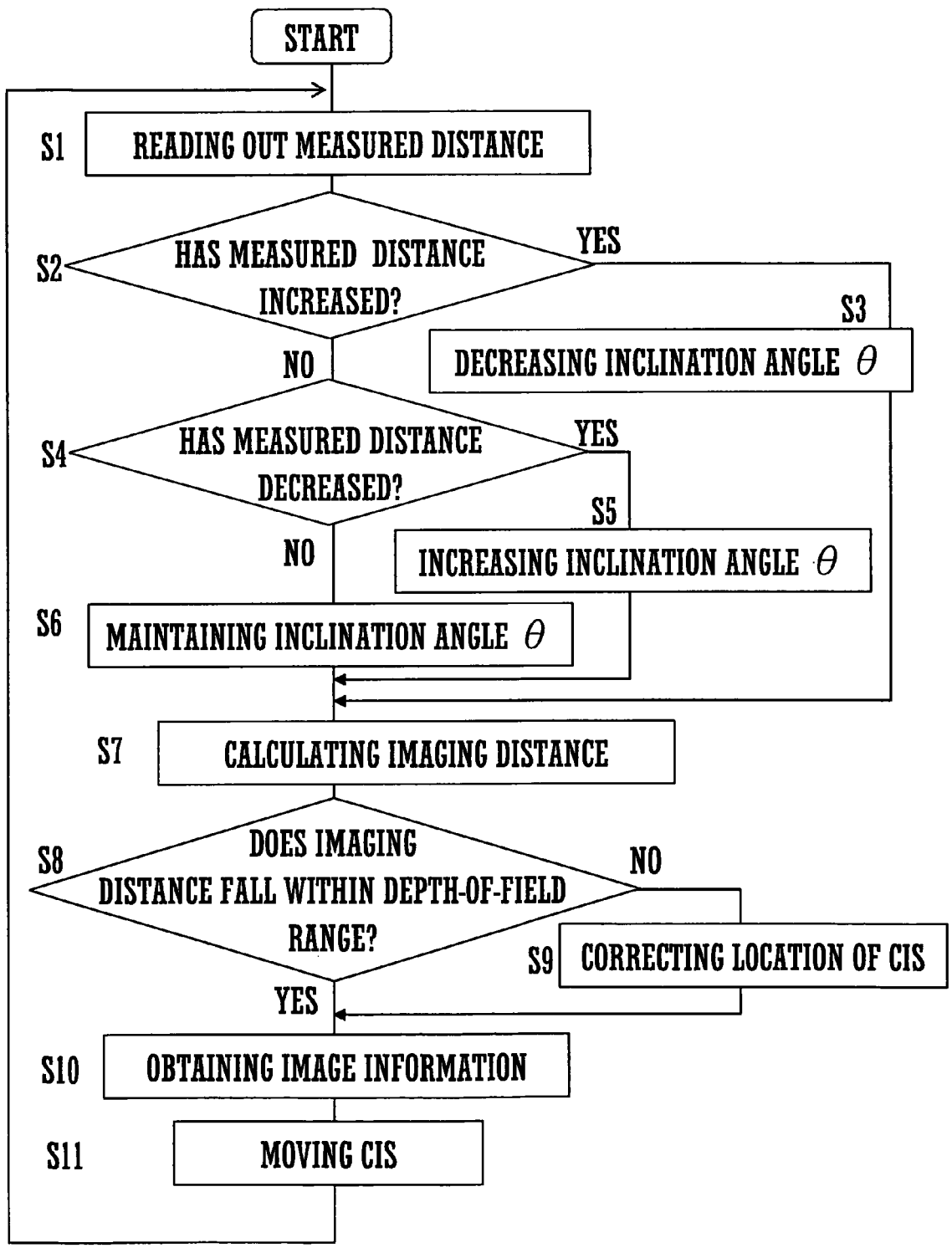

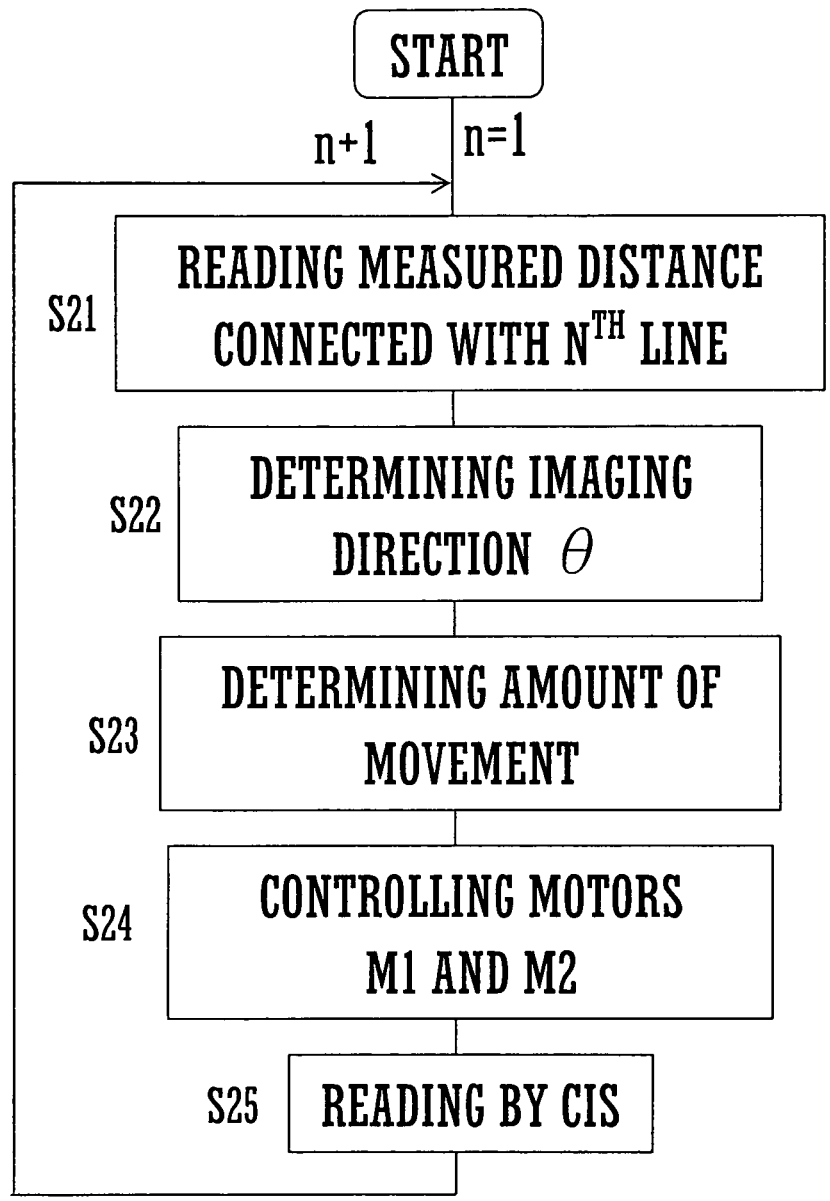

DOCUMENT READER WITH AN IMAGE SENSOR ROTATING IN ACCORDANCE WITH DISTANCE BETWEEN A DOCUMENT SURFACE AND A PLATEN SURFACE

CROSS REFERENCE

This Nonprovisional application claims priority under 35 U.S.C. §119(a) on Patent Application No. 2008-073981 filed in Japan on Mar. 21, 2008, the entire contents of which are hereby incorporated by reference.

BACKGROUND OF THE INVENTION

The present invention relates to a document reader for reading an image on a document surface of a document placed on a platen.

An image forming apparatus, such as a multifunctional printer, is provided with a document reader (see Japanese Patent Laid-Open Publication No. H07-193689 for example). Such a document reader employs at least one of a CIS (Contact-type image sensors) and a reduction-type image sensor.

Since the depth of field of the CIS is shallow, the document reader has to read the document surface while keeping substantially constant the image distance from the CIS to the document surface, in order to obtain a high-quality image. However, in copying a bound document for example, the image distance from the bound portion which is inevitably spaced upwardly apart from a platen glass falls out of the depth-of-field range, with the result that a blurred or distorted image is likely. This problem is essential not only to the Contact-type image sensors but also to the reduction-type image sensor, though there is a question of a degree.

Accordingly, the present invention intends to provide a document reader which is capable of ensuring a high-quality image even when the spacing between the document surface and the platen is uneven.

SUMMARY OF THE INVENTION

According to the present invention, an image sensor is rotatable about a rotational axis extending in a primary scanning direction and movable in a secondary scanning direction. The image sensor is caused to rotate in accordance with a change in the spacing between a document surface and a platen. By controlling the rotation of the image sensor so that the distance between the document surface and the image sensor in a direction in which a light-receiving surface of the image sensor is oriented falls within a depth-of-field range of the image sensor, a high-quality image with no blurred portion and less distortion can be obtained.

The foregoing and other features and attendant advantages of the present invention will become more apparent from the reading of the following detailed description of the invention in conjunction with the accompanying drawings.

BRIEF DESCRIPTION OF THE DRAWINGS

FIG. 3 includes views illustrating a structure of a CIS included in the document reading unit shown in FIG. 2;

FIG. 6 is a flowchart illustrating a control flow executed by a control section included in the document reader shown in FIG. 1; and FIG. 7 is a flowchart illustrating another control flow executed by the control section.

DETAILED DESCRIPTION OF THE INVENTION

Hereinafter, a document reader according to an embodiment of the present invention will be described with reference to the drawings. Here, description is directed to an arrangement in which the document reader is incorporated in a copier having a printer function, copier function and a FAX function.

Figure 1:
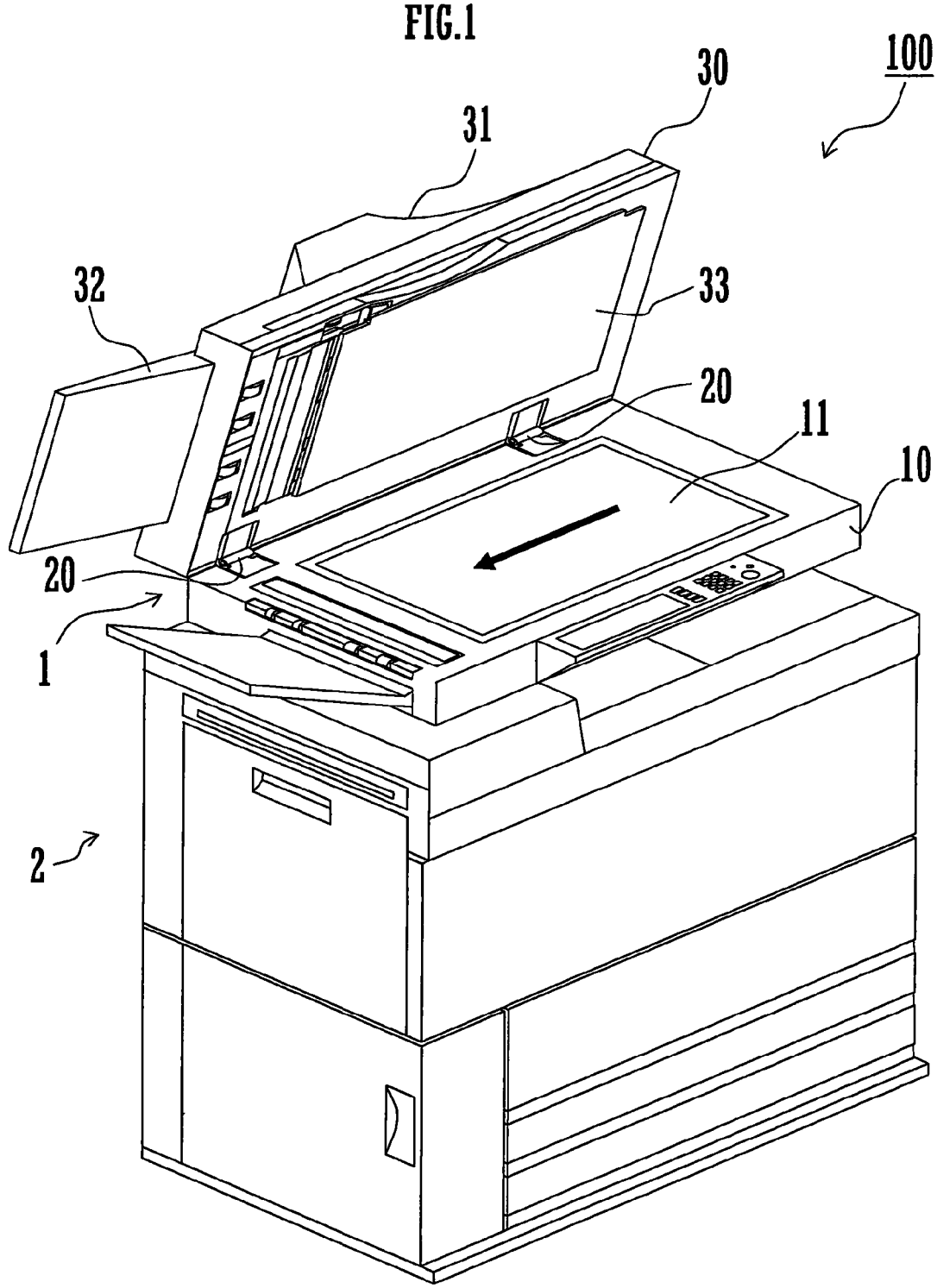
FIG. 1 is a view illustrating an outward appearance of a multifunctional copier provided with a document reader according to an embodiment of the present invention.

FIG. 1 is a perspective view of a copier 100 according to the present embodiment.

The copier 100 includes a document reader 1 and an image forming apparatus 2. The document reader 1 reads image data from an document surface of the document. The image forming apparatus 2 duplicates an image in accordance with the image data.

The document reader 1 includes a document reading unit 10, document cover unit 30, and hinge 20. The document cover unit 30 is pivotally supported on the document reading unit 10 by means of the hinge 20.

The document cover unit 30 includes a document feeding device 31, document tray 32, and document mat 33. In reading plural document sheets successively, the plural document sheets are placed on the document tray 32 with the document cover unit 30 closed to cover an upper surface of the document reading unit 10. The document feeding unit 31 feeds the document sheets one by one onto the upper surface of the document reading unit 10. In reading a document that cannot be fed automatically, such as a bound document, the document is set on the upper surface of the document reading unit 10 with the document cover unit 30 opened to expose the upper surface of the document reading unit 10.

The document reading unit 10 includes a platen 11 and an optical unit (not shown). The platen 11 is a glass plate positioned horizontally on the upper surface of the document reading unit 10. The optical unit, which is disposed within a housing of the document reading unit 10, reads image data from an document surface of a document placed on the platen 11. The arrow in FIG. 1 indicates a secondary scanning direction to be described later.

Figure 2:
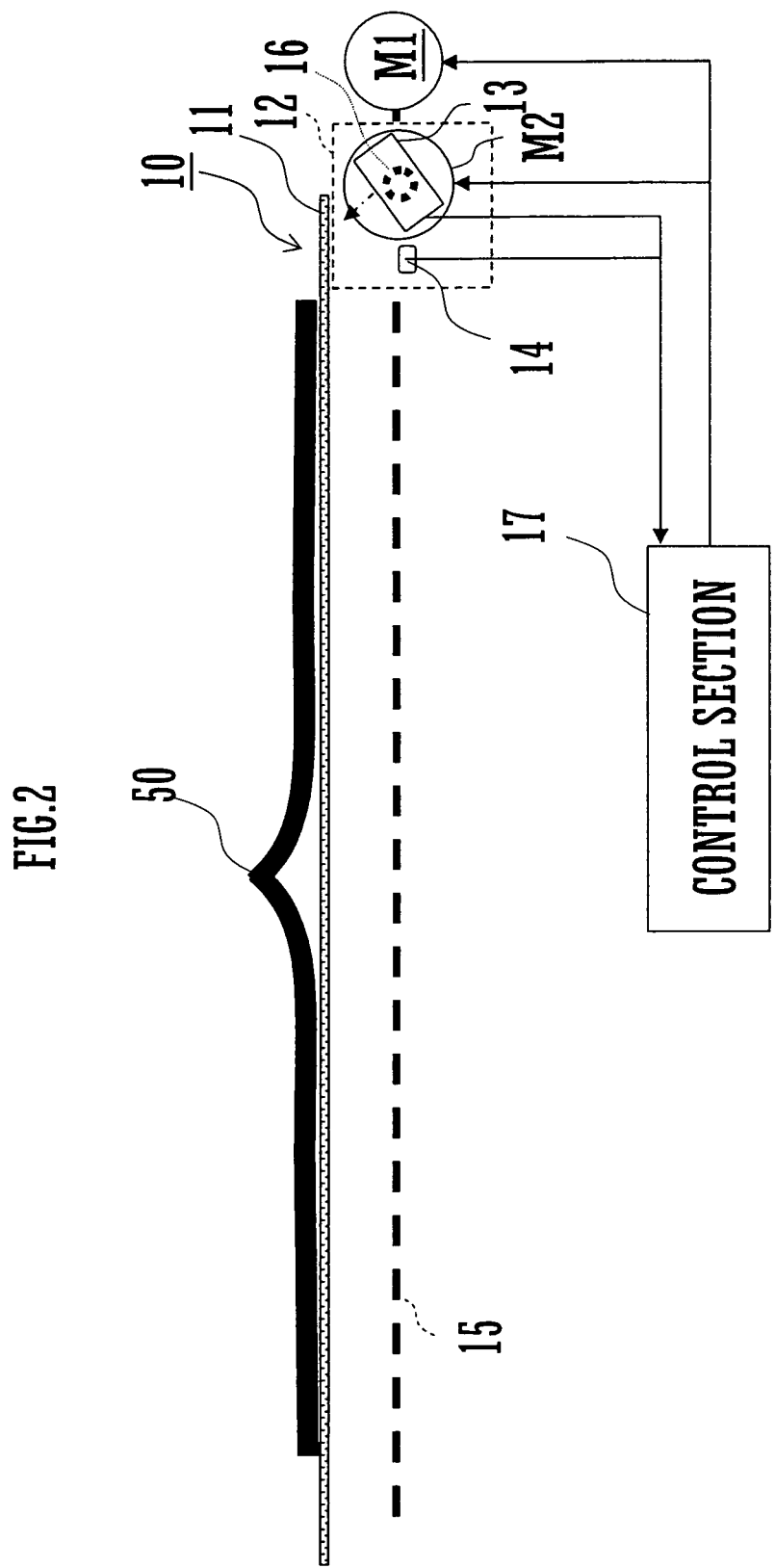
FIG. 2 is a view illustrating an internal arrangement of a document reading unit included in the document reader shown in FIG. 1.

FIG. 2 is a conceptual view illustrating an exemplary internal arrangement of the document reading unit 10. The direction along an axis 15 extending from the right-hand side toward the left-hand side in FIG. 2 is the secondary scanning direction parallel with the platen 11. The direction along an axis 16 extending perpendicular to the surface of the drawing sheet is a primary scanning direction parallel with the platen 11.

The document reading unit 10 includes the optical unit 12, control section 17 and motors M1 and M2, which are disposed below the platen 11. The optical unit 12 includes a CIS 13 and a range sensor 14.

The control section 17, which is equivalent to secondary scanning control section defined by the present invention, controls the motors Ml and M2 in accordance with signals inputted thereto from the optical unit 12.

The motor M1, which is equivalent to secondary scanning section defined by the present invention, is a stepping motor.

The motor M1 is connected to a roller (not shown). An endless belt (not shown) is entrained about the roller. The optical unit 12 is attached to the endless belt. Therefore, the optical unit 12 moves along the secondary scanning axis 15 by the operation of the motor M1. Such a moving mechanism may comprise any arrangement instead of the above-described arrangement.

The motor M2, which is equivalent to rotating section defined by the present invention, is a stepping motor for rotating the CIS 13 about the rotational axis 16.

The range sensor 14, which is distance information obtaining section defined by the present invention, is an optical position sensor in the present embodiment. The range sensor 14 is placed on the secondary scanning axis 15 and moves ahead of the CIS 13 by a predetermined spacing along the secondary scanning axis 15. The range sensor 14 has a main surface oriented in a vertically upward direction and measures the distance from the main surface to an object on the platen 11 in that direction. The range sensor 14 outputs a measured distance signal indicative of a measured distance every time the range sensor 14 moves. The control section 17 obtains the measured distance from the measured distance signal and maps the measured distance as connected with the location of the range sensor 14 on the secondary scanning axis 15 in memory.

The CIS 13, which is equivalent to the image sensor defined by the present invention, receives light from the direction of the normal to its light-receiving surface indicated by an arrow in FIG. 2. The CIS 13 faces a portion of the platen that extends between opposite ends of the platen along the primary scanning axis and reads a line image data item from a region of the document surface of a document 50 that extends in the primary scanning direction. The CIS 13 obtains a plurality of such line image data items from the document surface of the document 50 at a predetermined resolution (for example at a resolution of 600 dpi relative to an A3 size document) while moving along the secondary scanning axis 15.

The control section 17 reads the mapped measured distance out of the memory and controls the amount of revolution of the motor M2 so that the image distance from the light-receiving surface of the CIS 13 to the document surface falls within the depth-of-field range of the CIS 13. Specifically, when the measured distance connected with a region of the document surface from which line image data is to be obtained increases with movement of the CIS 13 in the secondary scanning direction, the control section 17 turns the imaging direction of the CIS 13 closer to the direction of the normal to the platen 11. On the other hand, when the measured distance decreases, the control section 17 turns the imaging direction of the CIS 13 away from the direction of the normal to the platen 11. Therefore, in obtaining line image data from a region around the binding margin extending centrally of the document 50, the control section 17 turns the imaging direction of the CIS 13 closest to the vertically upward direction.

By causing the range sensor 14 to perform distance measurement in parallel with reading of line image data by the CIS 13, all distance information items and all line image data items can be obtained if the optical unit 12 is moved in the secondary scanning direction only once. Thus, the process time can be shortened. Further, since the optical unit 12 and the range sensor 14 are synchronously driven by the same driving system, the driving system has a simplified structure.

Prior to the scanning operation, it is possible to perform a pre-scanning operation including only the distance measurement by the range sensor 14.

An arrangement is possible such that a driving system for the range sensor 14 is provided separately from a driving system for the CIS 13 to move the range sensor 14 independently of the CIS 13. Such an arrangement can eliminate limitations on the placement of the CIS 13 and the range sensor 14, thereby enhancing the design freedom. In addition, this arrangement makes it possible to shorten the process time.

FIG. 3 includes views illustrating the structure of the CIS 13; specifically, FIG. 3(A) is a perspective view of the CIS 13 cut away along a section perpendicular to the rotational axis, while FIG. 3(B) is a sectional view of the CIS 13.

The CIS 13 includes a substrate 131, housing 132, selfoc lens 133, light-receiving element 134, and light-emitting section 135. The housing 132 is fixedly attached to the rotating shaft of the motor M2. The substrate 30 is mounted on the bottom of the housing 132. The light-emitting section 135 comprises an LED array and emits light to illuminate the document surface. A plurality of selfoc lenses 133 and a plurality of light-receiving elements 134 are arranged in the primary scanning direction. Each of the selfoc lenses 133 forms an equal-magnification erected image from a region of the document surface that faces the selfoc lens 133 onto a respective one of the light-receiving elements 134. In the present embodiment, each of the light-receiving elements 134 comprises a CMOS image sensor and outputs signals in accordance with quantities of incident light.

Since the selfoc lenses 133 and the light-receiving elements 134 are arranged in the primary scanning direction, line image data items on linear regions of the document surface that face the plural selfoc lenses 133 can be obtained at a time. Further, since the CIS 13 employs, the driving system for the CIS 13 is simpler in structure than a driving system for the reduction-type image sensor comprising a CCD image sensor and a reflecting mirror, hence, calls for substantially no adjustment. Moreover, the CIS 13 can obtain image data from the document surface without distortion which is essential to the reduction-type image sensor.

Figure 4:
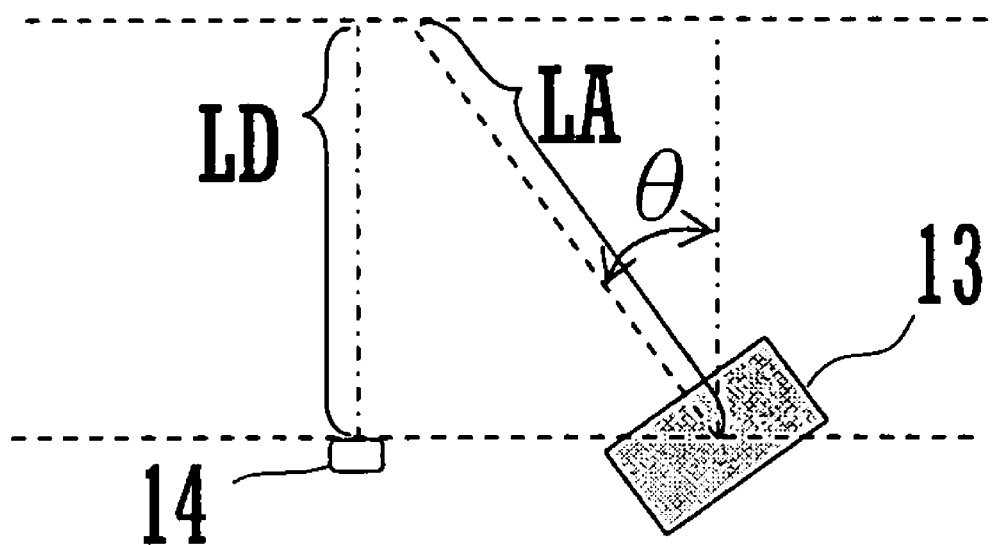
FIG. 4 is a conceptual view illustrating a relationship between a location and an inclined position of the CIS shown in FIG. 3.

FIG. 4 is a conceptual view illustrating a relationship between an inclined position of the CIS 13 and the image distance.

The CIS 13 is basically held in an inclined position relative to the secondary scanning direction and the vertical direction. The control section 17 controls the inclined position of the CIS 13 so that the image distance from the CIS 13 to the document surface falls within the depth-of-field range. Here, the relationship between the inclination angle of the CIS 13 and the image distance is described. In the following description, inclination angle θ is an angle at which the CIS 13 is inclined in the secondary scanning direction relative to the vertical direction; image distance LA is a distance from the light-receiving surface of the CIS 13 inclined at the inclination angle θ to the document surface; and measured distance LD is a distance from the range sensor 14 to the document surface. The inclination angle θ has the following relationship:

$$\theta = \cos^{-1}(LD/LA).$$

Therefore, it is possible to easily obtain a value of inclination angle θ by which the image distance LA is controlled to within the depth-of-field range based on a value of measured distance LD which is the result of measurement by the range sensor 14.

Figure 5:
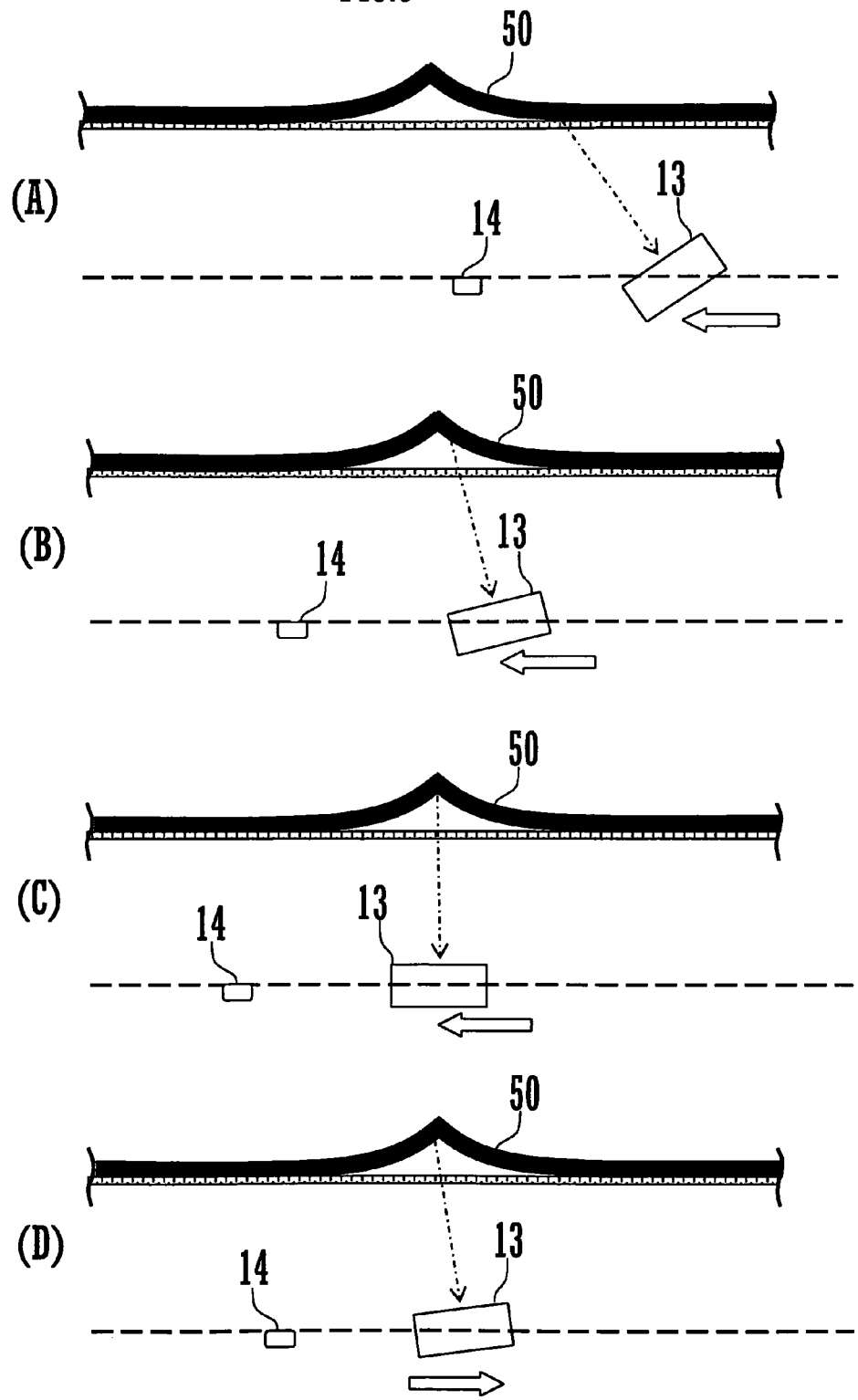
FIG. 5 includes conceptual views illustrating an operation of the CIS shown in FIG. 3.

FIG. 5 includes conceptual views illustrating an exemplary operation of the CIS 13.

FIG. 5(A) illustrates a condition in which the CIS 13 obtains line image data from the document surface coinciding with the upper surface of the platen 11. In this condition, the measured distance LD serves as a reference value and, hence, the CIS 13 assumes a predetermined inclined position at the inclination angle θ ranging from 0° to 90°. By so doing, the image distance is made to fall within the depth-of-field range of the CIS 13. As long as the measured distance LD is constant even when the optical unit 12 moves in the secondary scanning direction, the CIS 13 obtains line image data items while keeping the value of the inclination angle θ as it is.

FIG. 5(B) illustrates a condition in which the document surface of the document 50 is spaced upwardly apart from the platen 11, so that the measured distance LD increases. In this condition, the CIS 13 assumes an inclined position at the inclination angle θ taking on a value closer to 0° than in the condition shown in FIG. 5(A). By so doing, the image distance is made to fall within the depth-of-field range of the CIS 13. While the measured distance LD increases as the range sensor 14 moves in the secondary scanning direction, the CIS 13 obtains line image data items while rotating to decrease the inclination angle θ gradually.

As shown in FIG. 5(C), in obtaining line image data from a region of the document surface of the document 50 that is spaced most apart from the upper surface of the platen 11, the CIS 13 assumes an inclined position at the inclination angle θ taking on a value closest to 0θ.

FIG. 5(D) illustrates a condition in which the measured distance LD decreases. In this condition, the CIS 13 assumes an inclined position at the inclination angle θ taking on a larger value than in the condition in FIG. 5(C). In this case, it is sometimes difficult to maintain the image distance LA within the depth-of-field range of the CIS 13 because of the measured distance LD decreasing steeply. In such a case, line image data is obtained after the CIS 13 has been moved backward in the secondary scanning direction from its location shown in FIG. 5(C). By thus moving the CIS 13 forward and backward selectively in the secondary scanning direction, line image data can be obtained easily, with the image distance being limited to within the depth-of-field range.

The following description is directed to a control of the CIS 13 by the control section 17.

Though detailed description of the operation for obtaining measured distance information by the range sensor 14 will be omitted, the operation simply includes measuring the distance from the range sensor 14 to the document surface every time the range sensor 14 moves and mapping measured distance information connected with the location at which the range sensor 14 has measured the distance in the memory.

FIG. 6 is a flowchart illustrating an exemplary control flow executed by the control section.

The control section 17 initially causes the CIS 13 to assume an initial position at an initial inclination angle.

With the CIS 13 in the initial position, the control section 17 reads a value of measured distance LD connected with the location of a line image data reading start point out of the memory (step S1).

When the value of measured distance LD thus read out is larger than a reference distance to the upper surface of the platen or a value of measured distance connected with the location of a line data reading point at which immediately preceding reading has been performed, the control section 17 determines that the document surface is spaced upwardly apart from the platen 11 (step S2).

If it is determined that the document surface is spaced upwardly apart from the platen 11, the control section 17 calculates an amount by which the inclination angle θ is to be decreased and outputs a control signal to the motor M2 (step S3).

On the other hand, when the value of measured distance LD read out is smaller than the reference distance to the upper surface of the platen or the value of measured distance connected with the location of the line data reading point at which immediately preceding reading has been performed, the control section 17 determines that the document surface having been spaced upwardly apart from the platen 11 has come closer to the platen 11 (step S4).

If it is determined that the document surface has come closer to the platen 11, the control section 17 calculates an amount by which the inclination angle θ is to be increased and outputs a control signal to the motor M2 (step S5).

If there is no change in the distance between the document surface and the platen 11, the control section 17 maintains the value of inclination angle θ set last (step S6).

Subsequently, the control section 17 calculates a value of image distance LA from the CIS 13 in that inclined position and at that location (step S7).

Subsequently, the control section 17 determines whether or not the value of image distance LA thus calculated falls within the depth-of-field range (step S8).

If it is determined that the value of image distance LA falls out of the depth-of-field range, the control section 17 calculates an amount of movement of the optical unit 12 for correction of the location of the CIS 13 and then outputs a control signal to motor M1. If the value of image distance LA falls below the depth-of-field range, the control section 17 causes the CIS 13 to move backward in the secondary scanning direction. If the value of image distance LA is beyond the depth-of-field range, the control section 17 causes the CIS 13 to move forward in the secondary scanning direction.

Subsequently, the control section 17 causes the CIS 13 in that inclined position and at that location to obtain image information (step S10).

Subsequently, the control section 17 causes the CIS 13 to move to a location at which the CIS 13 has to obtain image information next. If the location of the CIS 13 has not been corrected, the control section 17 causes the CIS 13 to move forward by a given distance in the secondary scanning direction. If the location of the CIS 13 has been corrected, the control section 17 corrects the amount of movement by a required correction value and then causes the CIS 13 to move forward by a given distance in the secondary scanning direction (step S11).

By repeating the above-described steps by the control section 17, all image data items on the entire document surface can be obtained. Appropriate adjustment to the inclined position of the CIS 13 makes it possible to control the image distance from a region around the binding margin that is spaced upwardly apart from the platen or a like region of the document surface to within the depth-of-field range, thereby to prevent an image from blurring or distorting. Since the distance from the document surface can be adjusted relying upon only the rotating mechanism including the motors M1 and M2, the document reader can be reduced in size.

Description will be made of another control flow executed by the control section 17.

FIG. 7 is a flowchart illustrating another control flow executed by the control section.

While the control flow described above controls the location and the amount of movement of the CIS 13 so that the image distance LA falls within the depth-of-field range, the control flow to be described below controls the location and the amount of movement of the CIS 13 so that the image distance LA is kept substantially constant.

According to this control flow, the control section 17 reads a value of measured distance LD out of the memory (step S21), and then determines a value of inclination angle θ by calculation based on the value of measured distance LD thus read out (step S22). Specifically, the value of inclination angle θ is determined by substituting the value of measured distance LD and a value of image distance LA to be kept constant into the equation:

$$\theta = \cos^{-1}(LD/LA)$$

Subsequently, the control section 17 determines a location on the secondary scanning axis to which the CIS 13 is to move (step S23). Specifically, the control section 17 determines the location x of the destination based on the following equation: $x = X - (LA \times \sin\theta)$, where X represents a location on the secondary scanning axis that coincides with a region of the document surface from which a line image data item is to be obtained.

Subsequently, the control section 17 controls the motors M1 and M2 so that the optical unit 12 moves to the location x while the light-receiving surface of the CIS 13 is oriented at the inclination angle θ taking on the value calculated (step S24), and then obtains the line image data item with the image distance kept constant (step S25).

The foregoing embodiments are illustrative in all points and should not be construed to limit the present invention. The scope of the present invention is defined not by the foregoing embodiment but by the following claims. Further, the scope of the present invention is intended to include all modifications within the scopes of the claims and within the meanings and scopes of equivalents.

What is claimed is:

1. A document reader for reading an image from a document surface of a document placed on a platen, the document surface facing the platen, the document reader comprising:
   an image sensor which is rotatable about a rotational axis extending in a primary scanning direction contained in a plane parallel with the platen and movable in a secondary scanning direction which is contained in the plane parallel with the platen and is perpendicular to the primary scanning direction, the image sensor having a light-receiving surface configured to obtain image information from the document surface at a location facing in a vertical direction relative to the primary scanning direction, the image sensor having a fixed depth-of-field range in which the image sensor can obtain an image that is prevented from being blurred and distorted, in a distance between the document surface and the image sensor in a direction in which the light-receiving surface is oriented;
   a rotating section configured to rotate the image sensor;
   a secondary scanning section configured to move the image sensor;
   a distance information obtaining section configured to obtain distance information about a distance between the document surface and the platen while moving in the secondary scanning direction; and
   a secondary scanning control section configured to control the secondary scanning section while controlling the rotating section in accordance with a change in the distance between the document surface and the platen based on the distance information obtained by the distance information obtaining section, in such a manner that a distance between the document surface and the image sensor in a direction in which the light-receiving surface of the image sensor is oriented falls within the depth-of-field range of the image sensor, wherein:
   the secondary scanning control section controls the rotating section in such a manner that the direction in which the light-receiving surface of the image sensor is oriented is turned closer to a direction normal to the platen when a distance between the platen and a region of the document surface from which the image information is to be obtained is larger than a distance between the platen and a region of the document surface from which the image information has been obtained last, and
   the secondary scanning control section controls the rotating section in such a manner that the direction in which the light-receiving surface of the image sensor is oriented is turned away from the direction normal to the platen when the distance between the platen and the region of the document surface from which the image information is to be obtained is smaller than the distance between the platen and the region of the document surface from which the image information has been obtained last.

2. The document reader according to claim 1, wherein the secondary scanning control section causes the image sensor to move forward and backward selectively in the secondary scanning direction.

3. The document reader according to claim 1, wherein the distance information obtaining section obtains the distance information as the image sensor moves in the secondary scanning direction while obtaining the image information.

4. The document reader according to claim 1, wherein the distance information obtaining section moves in the secondary scanning direction while obtaining the distance information in advance before the image sensor moves in the secondary scanning direction while obtaining the image information.

5. A document reader for reading an image from a document surface of a document placed on a platen, the document surface facing the platen, the document reader comprising:
   an image sensor which is rotatable about a rotational axis extending in a primary scanning direction contained in a plane parallel with the platen and movable in a secondary scanning direction which is contained in the plane parallel with the platen and is perpendicular to the primary scanning direction, the image sensor having a light-receiving surface configured to obtain image information from the document surface at a location facing in a vertical direction relative to the primary scanning direction, the image sensor having a fixed depth-of-field range in which the image sensor can obtain an image that is prevented from being blurred and distorted, in a distance between the document surface and the image sensor in a direction in which the light-receiving surface is oriented;
   a rotating section configured to rotate the image sensor;
   a secondary scanning section configured to move the image sensor;
   a distance information obtaining section configured to obtain distance information about a distance between the document surface and the platen while moving in the secondary scanning direction; and
   a secondary scanning control section configured to control the secondary scanning section while controlling the rotating section in accordance with a change in the distance between the document surface and the platen based on the distance information obtained by the distance information obtaining section, in such a manner that a distance between the document surface and the image sensor in a direction in which the light-receiving surface of the image sensor is oriented falls within the depth-of-field range of the image sensor;

wherein the secondary scanning control section controls the rotating section so as to cause the image sensor to assume an inclined position at an inclination angle $\theta$ while controlling the secondary scanning section so as to cause the image sensor to move to a location x of a destination, the inclination angle $\theta$ and the location x being determined based on the relational expressions:

$$\theta = \cos^{-1}(LD/LA)$$

$$x = X - (LA \times \sin\theta)$$

where LA represents a reference value of a depth-of-field in a direction perpendicular to the light-receiving surface of the image sensor; LD represents a spacing between the image sensor and a region of the document surface to be imaged by the image sensor in a direction perpendicular to the platen; and X represents a coordinate of the region of the document surface to be imaged in the secondary scanning direction.

* * * * *